US009721275B1

(12) United States Patent
Grier

(10) Patent No.: US 9,721,275 B1
(45) Date of Patent: Aug. 1, 2017

(54) BROADCAST FEEDS FOR ORDER TRANSACTIONS

(75) Inventor: Benjamin D. Grier, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 473 days.

(21) Appl. No.: 13/270,996

(22) Filed: Oct. 11, 2011

(51) Int. Cl.
*G06Q 30/02* (2012.01)

(52) U.S. Cl.
CPC .................... *G06Q 30/0269* (2013.01)

(58) Field of Classification Search
USPC ............................................. 705/14; 704/14
See application file for complete search history.

(56) References Cited

U.S. PATENT DOCUMENTS

2004/0055010 A1* 3/2004 Fries et al. ............... 725/60
2010/0332330 A1* 12/2010 Goel et al. ............ 705/14.66

FOREIGN PATENT DOCUMENTS

WO    WO2011009141    * 1/2011 ............. G06Q 20/00

* cited by examiner

*Primary Examiner* — Rutao Wu
*Assistant Examiner* — Darnell Pouncil
(74) *Attorney, Agent, or Firm* — Lee & Hayes, PLLC

(57) ABSTRACT

The use of a broadcast feed to enable customers to pay for order may enable merchants to increase their online visibility and sales. An order for one or more items that is initiated by a customer may be received. The order may be transmitted to a broadcast feed provider to be presented as a message post in a broadcast feed page. Subsequently, an electronic payment for the order that is initiated by the customer through a link embedded in the message post may be received.

29 Claims, 9 Drawing Sheets

BROADCAST FEEDS FOR ORDER TRANSACTIONS

BACKGROUND

Today, people often have ready access to a host of information including broadcast information from blogs, message feeds, electronic postings, and/or other notifications that are accessible using portable computing devices such as mobile telephones. For example, a person may log into a social network website and update his or her own status and message feed or read statuses or message feeds from other users. In many instances, people may check or update their message feeds while engaged in other activities in public places.

People are also increasingly relying on electronic wallet services, such as electronic payment accounts, to pay for goods and services that they purchase using their portable computing devices. The use of electronic wallets may reduce the usage of cash, credit cards, debit cards, and other conventional payment instruments to pay for purchases.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques for using broadcast feeds to facilitate purchase transactions. A merchant may provide a broadcast feed of items and/or services that have been recently selected or ordered from the merchant by customers. In various embodiments, the merchant may be a brick-and-mortar merchant and the customers may be physically present at a merchant location operated by the merchant (e.g., at the merchant's store, restaurant, food cart, etc.). The broadcast feed may be disseminated by the merchant via a messaging web page, such as a blog web page, a social network web page, and/or by a messaging application ("app").

A customer may view the broadcast feed on a computing device (e.g., a mobile telephone, etc.) while at the retail location to identify an order listed in the broadcast feed as including one or more items ordered by the customer. Once the order has been identified by the customer, the customer may further claim the order through the broadcast feed to initiate a payment for the order using an electronic payment service. Upon the approval of an electronic payment, the merchant may fulfill the order and provide the one or more items to the customer. In some instances, the merchant may update the broadcast feed to indicate that the order is ready for pick up and/or provide other updates or information to customers. For example, the merchant may be a food vendor and the one or more items may be food items that the merchant prepared for the customer.

The use of a broadcast feed to disseminate order information to customers may enable a merchant to increase customer exposure to information from the merchant, such as through the merchant's blog or social network portal. Such web visibility may increase the popularity of the merchant, which may in turn lead to increased sales and revenue. Further, the broadcast feed of orders may also serve as a convenient gateway for customers to quickly access their respective online payment services, thereby enabling customers to electronically pay for their orders without using conventional payment instruments (e.g., cash, credit cards, checks, etc.). Additionally, the broadcast feeds may provide status updates (e.g., "Order 123 is ready!", etc.), which may enable customers to perform other errands rather than wait for their orders to be fulfilled.

An illustrative environment and illustrative techniques for using broadcast feeds to facilitate purchase transactions are described below. However, the described broadcast feed techniques may be implemented in other environments.

Illustrative System Architecture

Figure 1:
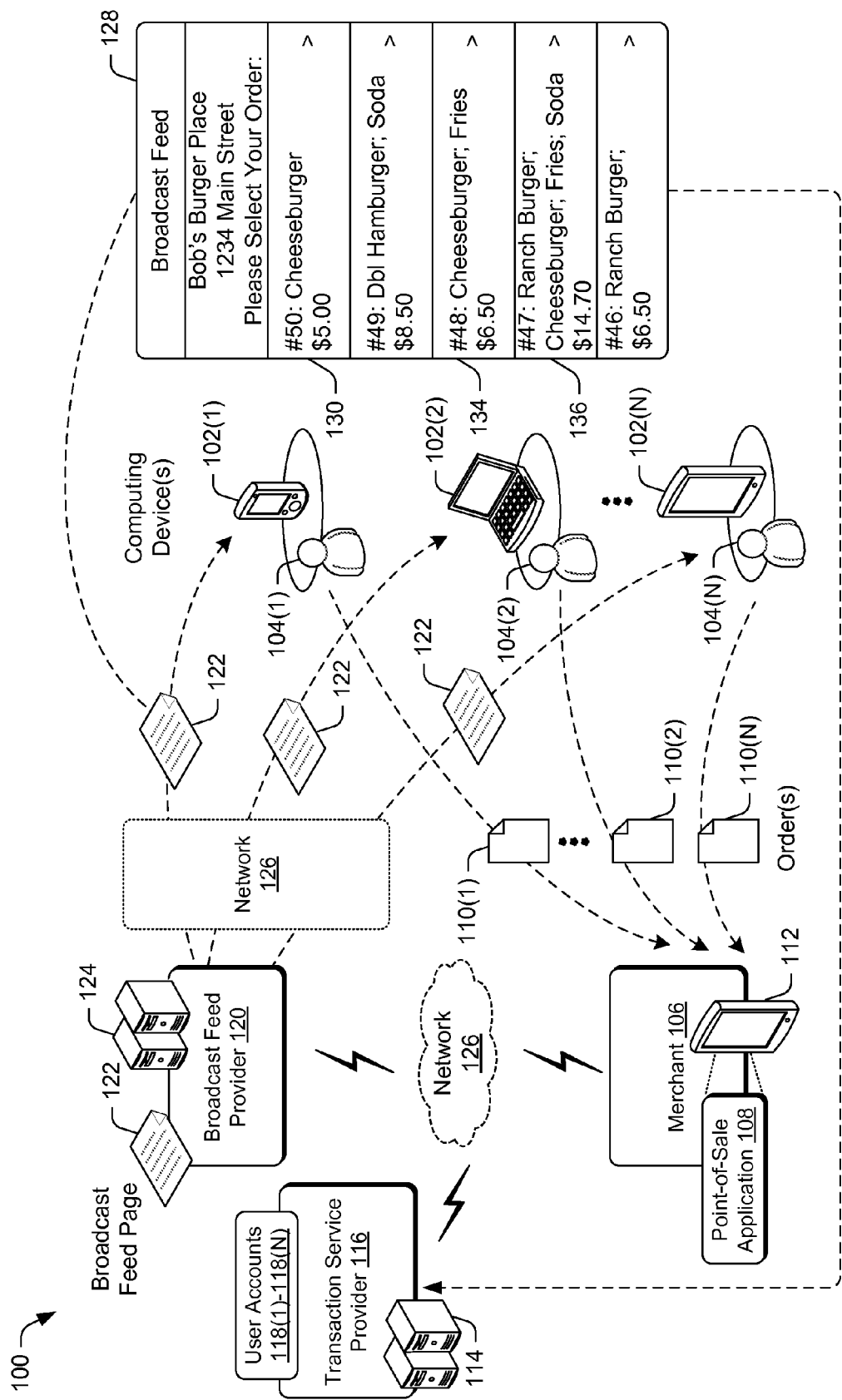
FIG. 1 is a schematic diagram of an illustrative computing environment for using a transaction broadcast feed to facilitate customer purchase transactions.

FIG. 1 is a schematic diagram of an illustrative computing environment 100 for using a transaction broadcast feed to facilitate customer purchase transactions. The computing environment 100 may include a plurality of computing devices 102(1)-102(N). The computing devices 102(1)-102(N) may be used by multiple customers 104(1)-104(1). The computing devices 102(1)-102(N) may include a mobile phone 102(1), a portable computer 102(2), and a tablet computer 102(3), among other possible devices. However, the computing devices 102(1)-102(N) are merely examples, and other electronic devices that are equipped with network communication components, data processing components, and electronic displays for displaying data may be employed.

The multiple customers 104(1)-104(N) may physically visit a merchant 106. The merchant 106 may be a brick-and-mortar retailer. For example, the merchant 106 may be a food vendor, an auto repair shop, or any other retailer that sells goods or services and/or produces made-to-order items. In some embodiments, the merchant 106 may use a point-of-sale application 108 to take orders 110(1)-110(N) from the customers 104(1)-104(N). The point-of-sale application may be implemented on a computing device 112. The computing device 112 may be a desktop computer, a portable computer, a tablet computer, a mobile communication device, or any other electronic device that is equipped with network communication components to receive and transmit data, data processing components to process data, and user interface components to receive data from and present data to a user.

In some embodiments, the computing environment 100 may include server(s) 114 that are operated by a transaction service provider 116. The server(s) 114 may store user accounts 118(1)-118(N). Each of the user accounts 118(1)-118(N) may enable a corresponding customer to pay for an order electronically. In turn, each of the user accounts 118(1)-118(N) may be funded from one or more linked payment instruments (e.g., a credit card, a checking account, and/or the like). In some embodiments, at least one of the user accounts 118(1)-118(N) may also store a balance of funds.

The computing environment may also include a broadcast feed provider 120, which may be a blog website, a social network website, a dedicated messaging application, or another electronic messaging service. In various embodiments, the merchant 106 may have configured a broadcast feed page 122 that is stored on the server(s) 124 of the broadcast feed provider 120. In some embodiments, the broadcast feed page 122 may be a portion of a social network web page or a blog web page. The social network web page or the blog web page may be used by the merchant 106 to promote the merchant 106 or the products or services offered by the merchant 106, build goodwill with consumers, or advertise the merchant 106 to the public at large. The broadcast feed page 122 may provide continuous or partially continuous messaging that is rendered and distributed to the computing devices 102(1)-102(N) by the server(s) 124 via a network 126. The merchant 106 may register with the broadcast feed provider 120 to establish the broadcast feed page 122. The computing device 112, the server(s) 114, and the server(s) 124 may be in communication by the network 126. The network 126 may be a local area network ("LAN"), a larger network such as a wide area network ("WAN"), a mobile telephone network, and/or a collection of networks, such as the Internet. The network 126 may be a wired network, a wireless network, or both.

When a customer, such as customer 104(1), places an order for one or more items with the merchant 106, the merchant 106 may input the order 110(1) into the point-of-sale application 108. The order, as discussed herein, may be an order to purchase services, existing items and/or made-to-order items. The merchant 106 may transmit the order information of the order 110(1) from the customer 104(1) to the broadcast feed page 122 as a message post. The order information for the order 110(1) may include a name of the customer, an order number, a listing of each item purchased, a description of each item purchased, a retail price of each item purchased, and/or a total amount due for the item(s) purchased, including any applicable taxes or surcharges. In some embodiments, the merchant may include one or more suggested up-sell items in the message post. For example, the merchant may write "Add fries to your burger order for only a dollar more. Your total without fries is $5.00. Pay $6.00 to get fries at a discount."

The merchant 106 may also include in the message post a link to a payment portal (e.g., a payment web page) that is operated by the transaction service provider 116, so that the customer 104(1) may pay for the order. In some embodiments, the merchant 106 may manually compose a message post and then upload the message post to the broadcast feed provider 120 for display in the broadcast feed page 122 using a web browser.

In other embodiments, the merchant 106 may use the point-of-sale application 108 to upload the message post of the order information to the broadcast feed provider 120. In such embodiments, the point-of-sale application 108 may have features that facilitate the autonomous generation of a message post for the order information of each order that is inputted by the merchant 106. Accordingly, the point-of-sale application 108 may be configured to automatically upload the message post for an order to the broadcast feed provider 120 or when commanded to do so by the merchant 106. In such embodiments, the metadata (e.g., text) of the link that is inserted into a message post by the point-of-sale application 108 may include embedded order information that may be later extracted by the transaction service provider 116. The embedded order information may include information such as an order number, item(s) and/or a total amount due, possibly including an additional amount due if the customer selects one or more up-sell items.

Accordingly, the broadcast feed page 122 may display order information for orders from various customers, including the customers 104(2)-104(N). The orders may have been passed to the broadcast feed provider 120 in a similar manner as described above. For example, the broadcast feed page 122 may include order information for an order 110(2) that is placed by a customer 104(2) and for an order 110(N) that is placed by the customer 104(N). In this way, customers may access the broadcast feed page 122 to claim and pay for orders that are shown in the broadcast feed page 122. Further, the broadcast feed page 122 may include other message posts of messages that are posted by the merchant 106, such as general up-sell offers, general announcements, upcoming events, etc.

In some embodiments, rather than generating message posts of order information for uploading to the broadcast feed page 122, the point-of-sale application 108 may use the transaction service provider 116 to generate message posts of order information for upload. Thus, the point-of-sale application 108 may instead send the order information for an order, such as the order 110(1), to the transaction service provider 116. The transaction service provider 116 may create message posts of the orders for display in the broadcast feed page 122. In various embodiments, the transaction service provider 116 may include in each message post a link to a corresponding payment page that is pre-populated with order information for the order (e.g., order number, total amount due for the order, items in the order, and/or so forth). For example, the link may contain a page identifier for the corresponding payment page. Thus, the corresponding payment page for the order 110(1) may enable the customer 104(1) to pay for the order 110(1), the corresponding payment page for the order 110(2) may enable the customer 104(2) to pay for the order 110(2), and so on and so forth. Once the message post for an order is created, the transaction service provider 116 may pass the message post to the broadcast feed provider 120 for posting in the broadcast feed page 122. In some embodiments, the transaction service provider 116 and the broadcast feed provider 120 may be parts of the same entity.

In some embodiments, customers may use the broadcast feed page 122 to pay for orders. For example, the customer 104(1) may access the broadcast feed page 122 to pay for the order 110(1). The merchant 106 may provide a uniform resource locator (URL) to the customer 104(1) that enables the customer 104(1) to navigate to the broadcast feed page 122 using the computing device 102(1). In some embodiments, the merchant 106 may verbally inform the customer 104(1) of the URL, or post a sign containing the URL in its retail premise so that the customer 104(1) may enter the URL into a web browser on the computing device 102(1). In other embodiments, the merchant 106 may display a matrix code, such as a quick response (QR) code, an Aztec code, a MaxiCode, or the like that encodes the URL of the broadcast feed page 122. In turn, the customer 104(1) may use a camera on the computing device 102(1) to capture the matrix code. An application on the computing device 102(1) may further translate the matrix code into the URL so that the web browser on the computing device 102(1) may navigate to the URL.

Accordingly, the customer 104(1) may download the broadcast feed page 122 via the network 126 for viewing on the computing device 104(1). As shown in an example display 128, the broadcast feed page 122 may display a list of message posts, in which each message post is a corresponding order made by each of the customers 104(1)-104(N). Thus, given that message post 130 corresponds to the order 110(1), the customer 104(1) may select a link 132 embedded in the message post 130 to access a corresponding payment page. Following payment, the merchant 106 may deliver or provide the one or more items (e.g. a, cheeseburger) in the order 110(1) to the customer 104(1). Likewise, the customers 104(2)-104(N) may use their corresponding computing devices 102(1)-102(N) to download the broadcast feed page 122, and claim and pay for their respective orders 110(2)-110(N) in a similar manner. For example, the customer 104(2) may identify message post 134 of the broadcast feed page 122 as corresponding to the order 110(2). Similarly, the customer 104(N) may identify message post 136 as corresponding to the order 110(3). The use of message posts in the broadcast feed page 122 to pay for orders is further illustrated below in FIG. 2.

Figure 2:
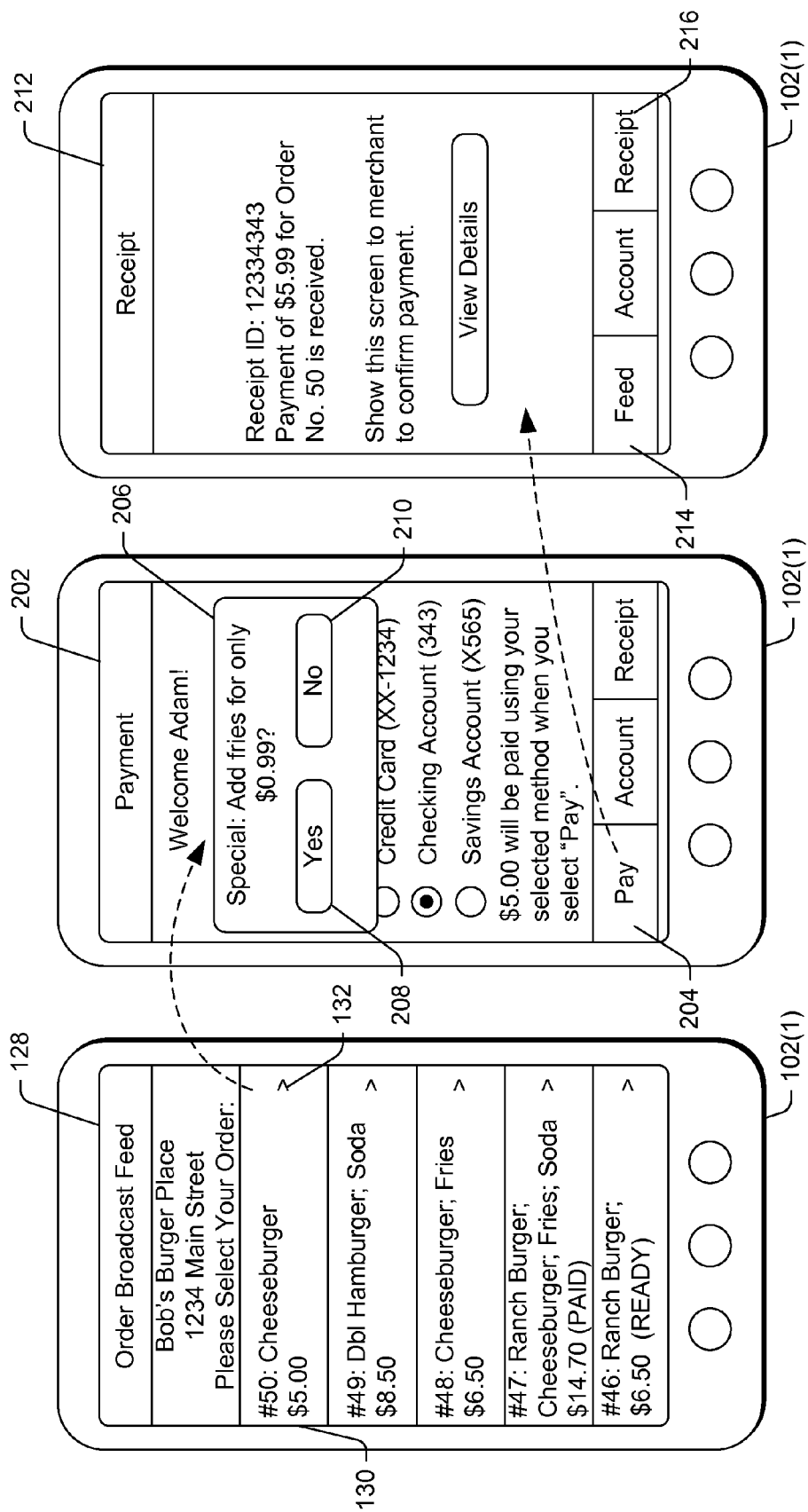
FIG. 2 shows an illustrative broadcast feed page that enables a customer to pay for an order that is listed in a transaction broadcast feed page.

FIG. 2 shows an illustrative broadcast feed page that enables a customer to pay for an order that is listed in a transaction broadcast feed page. The transaction broadcast feed page may be the broadcast feed page 122. As described in FIG. 1, the broadcast feed page 122 may be presented on a computing device, such as the computing device 102(1) that is used by the customer 104(1). The broadcast feed page 122 may include multiple message posts that correspond to orders made by customers, such as the customers 104(1)-104(N). Accordingly, when the customer 104(1) identifies the message post 130 as corresponding to the order 110(1) placed by the customer 104(1), the customer 104(1) may select the link 132 that is embedded in the message post 130. The selection of the link 132 may trigger the servers(s) 114 of the transaction service provider 116 to provide a payment page 202 to the computing device 102(1). The payment page 202 may be a web page that is viewable by the customer 104(1) via a web browser on the computing device 102(1). The payment page 202 may also be displayed by a customized application executed by the computing device 102(1). The payment page 202, or data thereon, may be provided by the transaction service provider 116.

The payment page 202 may display a user login menu that prompts the customer 104(1) to login or create a new user account. Once the customer 104(1) has authenticated to an existing user account or created a new user account on the transaction service provider 116 (e.g., user account 118(1)), the payment page 202 may enable the customer 104(1) pay for the order 110(1).

In instances in which the message post 130 was composed by the merchant 106 or generated by the point-of-sale application 108 of the merchant 106, the payment page 202 may not be pre-populated with any order information. Accordingly, the payment page 202 may prompt the customer 104(1) to directly enter the total amount the customer 104(1) wishes to pay. The amount entered by the customer 104(1) may reflect whether the customer 104(1) desires to take advantage of any up-sell offers by the merchant 106. The payment page 202 may also display a pay option 204. Accordingly, the customer 104(1) may select the pay option 204 to pay for the order 110(1). As such, the merchant 106 may rely on the amount paid by the customer 104(1) to determine whether an up-sell was successful, and fulfill the order 110(1) accordingly. In some embodiments, the merchant may receive a feedback message that indicates a selection of the up-sell item/service by the customer.

Nevertheless, the payment page 202 may be populated with order information from the embedded metadata in the link of the message post 130 that led to the payment page 202. Once populated, the payment page 202 may display the order information, including an order number, item(s) ordered, the total amount(s) due for the order, and/or so forth. The total amount(s) due may include an amount option for the order 110(1) with one or more up-sell items and/or an amount option for the order 110(1) without one or more up-sell items. Accordingly, once the customer 104(1) has selected an amount option, the customer 104(1) may select the pay option 204 to pay for the order 110(1). Once again, the merchant 106 may rely on the amount paid by the customer 104(1) to determine whether an up-sell was successful and/or receive a separate up-sell message, and fulfill the order 110(1) accordingly.

However, in other instances, payment page 202 prepared by the transaction service provider 116 may be in the form of a custom page that corresponds to a custom link, in which the custom page is pre-populated with order information for the order 110(1). The order information for the order 110(1) may have been previously disclosed to the transaction service provider 116 when the transaction service provider 116 prepared the message post 130 for the point-of-sale application 108. The order information may include data such as an order number, a total amount due, items orders, and/or so forth. The payment page 202 may also display a pay option 204. Accordingly, the customer 104(1) may select the pay option 204 to pay for the order 110(1). In both types of instances, the payment page 202 may also display a menu that enables the customer 104(1) to select a payment instrument from multiple linked payment instruments (e.g., credit card, checking account, savings account, etc.) prior to selecting the pay option 204.

In such instances, the transaction service provider 116 may additionally present an up-sell prompt 206 on the payment page 202 prior to the user selecting the pay option 204. The up-sell prompt 206 may display one or more items for purchase that relate to an item in the order 110(1). In some embodiments, the display of the one or more up-sell items by the up-sell prompt 206 may be configured by the merchant 106. For example, the merchant 106 may have determined from a past sales history that users who order cheeseburgers have a high likelihood of buying fries. Accordingly, the merchant 106 may store the up-sell associations between different items in an up-sell configuration file, in which each up-sell association offers one or more second items (or services) for sale based on the purchase of one or more first items. In some embodiments, the merchant 106 may provide the up-sell configuration file to the transaction service provider 116. Subsequently, the up-sell configuration file created by the merchant 106 may be used by the transaction service provider 116 to up-sell items to a customer of the merchant 106 (e.g., customer 104(1)). In other embodiments, the one or more up-sell items presented in the up-sell prompt 206 may be provided by the transaction service provider 116 based on its analysis of the purchase items listed in the broadcast feed page 122. Thus, the up-sell selections may be implemented by the merchant 106 and/or the transaction service provider 116.

In various embodiments, such as when the broadcast feed 128 is an application, the up-sell prompt 206 that is displayed to the customer 104(1) may include an accept option 208 and a decline option 210. Thus, if the customer 104(1) selects the accept option 208, the transaction service provider 116 (or the merchant 106) may add one or more additional up-sell items to the order 110(1), modify the total amount due of the order shown on the payment page 202 to reflect the additional up-sell items, and then possibly cause the broadcast feed provider 120 to update message post 130 in the broadcast feed page 122 to show the inclusion of the one or more additional up-sell items. Accordingly, the customer 104(1) may select the pay option 204 to pay the newly updated amount due for the order 110(1). However, if the customer 104(1) selects the decline option 210, no changes are made by the transaction service provider 116 to the order 110(1). Accordingly, the customer 104(1) may select the pay option 204 to pay the original amount due for the order 110(1). In other embodiments, the up-sell prompt 206 may also be used to instances in which the payment page 202 is populated with order information from the embedded metadata in the link of the message post 130. In such embodiments, the up-sell prompt 206 may offer the customer 104(1) the option of selecting an amount for the order 110(1) with one or more up-sell items or an amount for the order 110(1) without one or more up-sell item.

Once the customer 104(1) has electronically paid for the order 110(1), the servers(s) 114 of the transaction service provider 116 may provide a receipt page 212 to the computing device 102(1). The receipt may include details such as the total amount paid for the order 110(1), a receipt identifier, and/or the order number that corresponds to the order 110(1). Accordingly, when the merchant 106 is ready to provide the one or more items included in the order 110(1) to the customer 104(1), the customer 104(1) may use the receipt page 212 as a proof-of-purchase to take delivery of the one or more items. In some embodiments, the receipt page 212 may further include a feed option 214 that enables the customer 104(1) to return to the broadcast feed page 122. Additionally, the selection of a receipt option 216 that is included in the receipt page 212 may enable the customer 104(1) to view different receipts from the merchant 106.

It will be appreciated that in other embodiments, each of the broadcast feed page 122, the payment page 202, the up-sell prompt 206, and/or the receipt page 212 may be a user interface object that is displayed by an application that is installed on the computing device 102(1). The application may further interface with a camera of the computing device 102(1) to recognize matrix codes to obtain broadcast feed pages, such as the broadcast feed page 122. Further, in additional embodiments, the broadcast feed provider 120 may be an integral part of the transaction service provider 116 rather than being a separate service provider.

Example Server Modules

Figure 3:
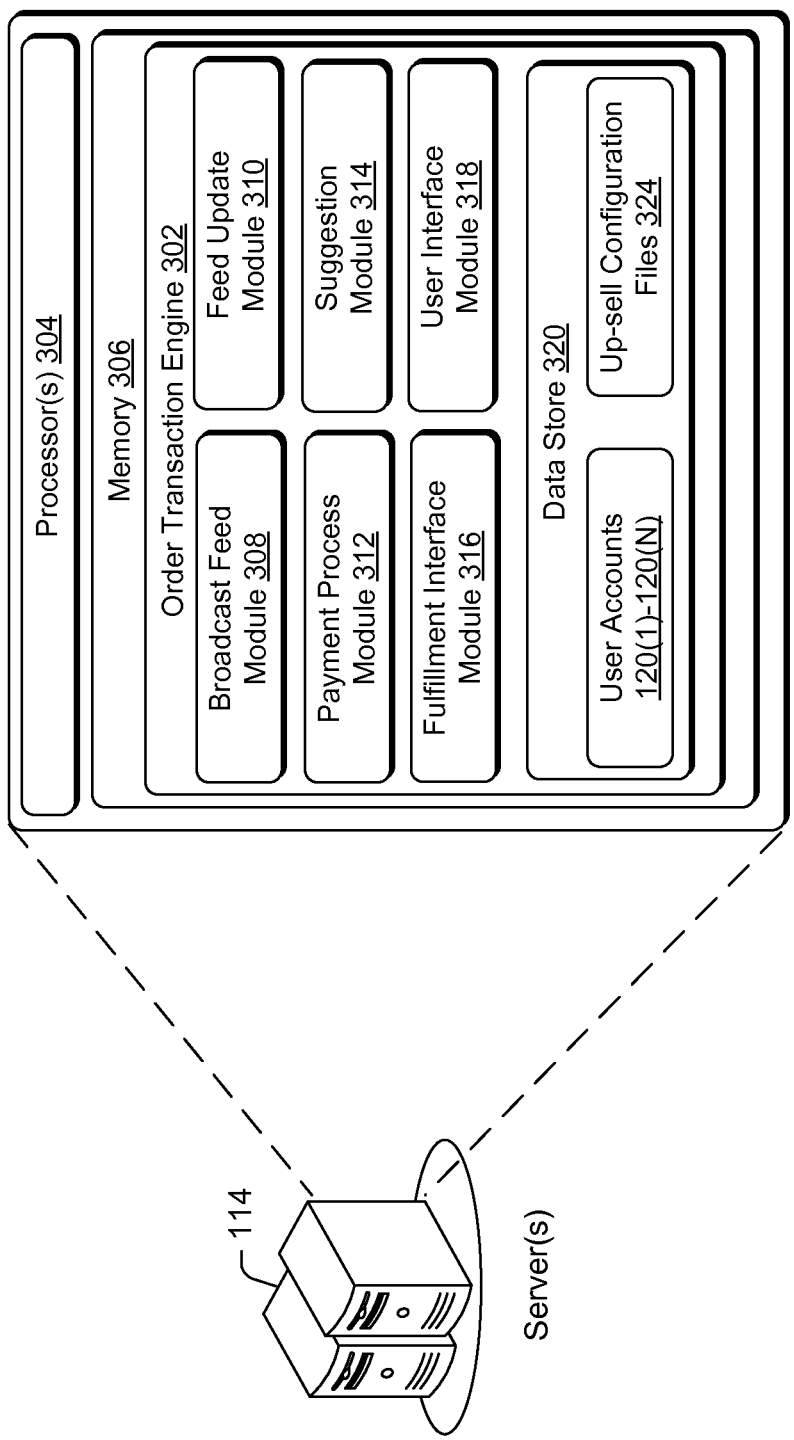
FIG. 3 is a schematic diagram of illustrative components in an example order transaction engine that uses transaction broadcast feeds to facilitate purchase transactions.

FIG. 3 is a schematic diagram of illustrative components in an example order transaction engine 302 that uses transaction broadcast feeds to facilitate purchase transactions. The order transaction engine 302 may be implemented by the server(s) 114 of the transaction service provider 116. The server(s) 114 may include processor(s) 304 and memory 306. The memory 306 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The order transaction engine 302 may include a broadcast feed module 308, a feed update module 310, a payment process module 312, a suggestion module 314, a fulfillment interface module 316, and a user interface module 318. The modules may include routines, programs instructions, objects, and/or data structures that perform particular tasks or implement particular abstract data types. The server(s) 114 may also implement a data store 320 that stores data used by the order transaction engine 302.

The broadcast feed module 308 may format the order information of orders for posting by the broadcast feed provider 120 as message posts in a broadcast feed page, such as the broadcast feed page 122. The order information for each order may include data such as a name of the customer, an order number, a listing of each item purchased, a description of each item purchased, a retail price of each item purchased, and/or a total amount due for the item(s) purchased, including any applicable taxes or surcharges. The order information may also include a link to a payment page that is to be generated by the payment process module 312. The payment page may enable a customer to pay for the order.

In various embodiments, the broadcast feed module 308 may format the order information for an order according to message post constraints imposed by the broadcast feed provider 120. Such constraints may include a character limit, a word limit, limit on the number of text lines, limit on the usage of specific characters, codes, and/or words, and/or so forth. Once the broadcast feed module 308 has formatted the order information for an order, the broadcast feed module 308 may delivery the formatted order information to the broadcast feed provider 120.

In additional embodiments, the broadcast feed module 308 may also format announcements and messages that are generated by the suggestion module 314 for posting by the broadcast feed provider 120. The formatting of such announcements and messages may also conform to the message post constraints imposed by the broadcast feed provider 120. In further embodiments, the broadcast feed module 308 may also upload other announcements or messages to the broadcast feed page. These announcements may include marketing or entertainment information, such as statistics or trivia provided by the merchant, upcoming events sponsored by the merchant, and/or so forth.

The feed update module 310 may provide updates to existing message postings that have been posted to a broadcast feed page by the broadcast feed provider 120. The feed update module 310 may update a message post with new information that is received from the merchant 106. Such information may include a change in the status of order. Such change in the order status may include a cancellation of an order, a modification to the items purchased in the order, a modification to the description of each order, a modification to a quantity of each item purchased in an order, a completion of an order, a delivery of an order, and/or so forth. Accordingly, the feed update module 310 may send information to the broadcast feed provider 120 that causes the broadcast feed provider 120 to append a relevant status indicator (e.g., canceled, modified, ready, etc.) to a corresponding message posting.

The feed update module 310 may also update a message posting based on information generated by the other modules in the order transaction engine 302. In at least one embodiment, the feed update module 310 may send changes to the broadcast feed provider 120 to update a corresponding message posting with a paid status indicator when a payment for an order is accepted by the payment process module 312. In at least one embodiment, the status indicators that are generated for posting in the broadcast feed pages may include notation symbols (e.g., hash tags) that enable the sorting and/or the filtering of the message postings according to the status indicators. Additionally, updates provided by the feed update module 310 that are implemented by the broadcast feed provider 120 may include amendments to announcements or messages. In some embodiments, the feed update module 310 may be an integrated part of the broadcast feed module 308.

The payment process module 312 may enable customers to pay for the orders that are presented as message posts in broadcast feed pages. The payment process module 312 may generate links for orders, such that the links are inserted into message posts by the broadcast feed module 308. The payment process module 312 may also generate payment pages that are linked to by the links, such as the payment page 202. Each of the generated payment pages may include order information for a particular order (e.g., a merchant identifier, a description of the items, a total amount due for the items, etc.), as well as a login prompt to prompt a customer to log into a particular user account, such as the user account 118(1). Thus, once a customer logs into a specific user account using a particular payment page, the payment process module 312 may associate the order that is shown on the particular payment page with the specific user account. The customer is then able to pay for the order using the specific user account.

In various embodiments, the payment process module 312 may perform a validation of each payment that is submitted prior to payment acceptance. In some embodiment, the validation may include ascertaining that a payment for an order is initiated at a computing device that is within a predetermined distance of a geographical location of a merchant, such as the merchant 106. The payment process module 312 may obtain a geographical location of a computing device as metadata when a user uses the computing device to view a payment page for an order. The geographical location of the computing device may be a location that is determined by an internal global positioning system (GPS) component of the computing device, an assisted-GPS component of the computing device, and/or a cellular triangulation component of the mobile.

Accordingly, if the geographical location of the computing device that is used to provide a payment for an order is within a predetermined distance threshold of a geographical location of a merchant that is identified in the order, the payment process module 312 may accept the payment. Otherwise, the payment process module 312 may deny the payment. For example, the payment process module 312 may only accept a payment made by the customer 104(1) on the computing device 102(1) for the order in the message post 130 when the computing device 102(1) is located within a predetermined distance (e.g., 20 feet) of the physical retail location of the merchant 106. Such validation by the payment process module 312 may prevent unintentional, malicious, or fraudulent payment activity.

In other embodiments, the validation may further include a fraud check of a submitted payment. In various embodiments, the payment process module 312 may use a machine learning algorithm or a classifier algorithm to detect a payment request that appears unusual or anomalous, such as not fitting into previous patterns of payments, withdrawals, transfers, and/or other activities of a customer. Assuming no potentially fraudulent activity is detected for a payment, the payment process module 312 may approve the payment to an account of a merchant, such as the merchant 106. The account of the merchant 106 may be an account that is maintained by a financial institution for the merchant 106 or maintained by the merchant on the computing device 112. Otherwise, if potentially fraudulent activity is detected, the payment process module 312 may reject the payment. Once the payment process module 312 accepts a payment, the payment process module 312 may transfer the payment to the merchant. In some embodiments, the payment process module 312 may withhold a portion of the payment as a service surcharge for performing the payment transaction service. In still other embodiments, the validation may include a combination of the geographical distance check and the fraud check. Thus, the payment process module 312 may accept a payment when both checks are passed. Otherwise, the payment process module 312 may reject the payment.

The suggestion module 314 may prompt customers to add additional items (e.g., up-sell items) to orders. In some embodiments, the suggestion module 314 may provide up-sell suggestions to the customers of a merchant based on an up-sell configuration file supplied by the merchant. The up-sell configuration file may include up-sell associations that offer one or more additional items for sale based on the purchase of one or more original items by a customer. The suggestion module 314 may work cooperatively with the payment process module 312 to present such up-sell suggestions on a payment page during a payment for an order by a customer.

In further embodiments, the suggestion module 314 may analyze a transaction history that includes items that were listed in the broadcast feed page (e.g., broadcast feed page 122) of a merchant, and provide up-sell suggestions based on this information. The suggestion module 314 may use a machine learning algorithm or a classifier algorithm to analyze the transaction history. Based on the analysis, the suggestion module 314 may detect patterns or trends in the transaction history, such as items that are being ordered (e.g., best selling items, popular items, unpopular items, complementary items), and recommend items as up-sell items based on the patterns or trends. For example, the suggestion module 314 may recommend complementary items or popular items as up-sell items.

In various embodiments, the suggestion module 314 may recommend one or more items that have some correlation with one or more items that are being ordered by a particular customer (i.e., a complementary item). For example, when a customer orders a cheeseburger from a merchant, the suggestion module 314 may recommend fries as an up-sell item. The recommended items may be items that are being sold by the same merchant, or items from another merchant that has an affiliation with the merchant. For example, when the customer orders a beach towel from a merchant, the suggestion module 314 may recommend sun tan lotion that is being sold by another affiliated merchant as an up-sell suggestion. Such custom tailored up-sell suggestions may be presented to specific customers by the payment process module 312 in corresponding payment pages. These suggestions may be developed by the suggestion module 314 using a machine learning or classifier analysis of sales data of one or more merchants. The suggestions may offer promotional discounts or savings that are otherwise unavailable from the merchant or the affiliated merchant. These suggestions may be presented as part of payment pages and/or posted by the broadcast feed module 308 as message posts on the broadcast feed page of the merchant.

The fulfillment interface module 316 may interface with an order fulfillment application of a merchant, such as an order fulfillment application that is on the computing device 112 of the merchant 106. The fulfillment interface module 316 may provide a list of paid orders to the order fulfillment application of the merchant. As such, each entry in the list may include information on the items in a paid order (including any up-sell items). Accordingly, a merchant may fulfill paid orders based on the list of orders that is displayed by the order fulfillment application.

Conversely, the merchant may also use the order fulfillment application to send order fulfillment activity to the fulfillment interface module 316. For example, when an order of cheeseburgers and fries are ready for pick up by a customer, the merchant may use the order fulfillment application to send the status update to the fulfillment interface module 316. In turn, the fulfillment interface module 316 may command the feed update module 310 to update the corresponding message post on a broadcast feed page, such as the broadcast feed page 122. The feed update module 310 may update the corresponding message post by sending the updated order information to the broadcast feed provider 120. In some embodiments, rather than interfacing with order fulfill applications, the fulfillment interface module 316 may display information and accept input of fulfillment activities from merchants via a web interface that is accessible from web browsers.

The user interface module 318 may enable an operator to interact with the various modules of the order transaction engine 302 using a user interface. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. For example, an operator may use the user interface module 318 to manage, i.e., create, update, modify, and/or suspend one or more of the user accounts 118(1)-118(N). Additionally, the operator may use the user interface module 318 to setup or modify the distance threshold used by the payment process module 312. Further, once a potential fraudulent payment is detected, the payment process module 312 may provide details to the operator via the user interface module to enable the operator to conduct manual review, and in certain instances, override the payment process module 312 to accept the payment.

The user interface module 318 may also have data gathering and reporting capabilities. For example, the user interface module 318 may enable an administrator of the order transaction engine 302 to generate reports that show sale patterns or trends for different merchants in predetermined time periods (e.g., daily, weekly, monthly, etc.). The sale pattern or trend reports may indicate popular items, effective up-sell items, most profitable items, and so forth. Accordingly, the administrator may further use the user interface module 318 to configure or adjust associations between items and up-sell items, transmit sale pattern or trend reports to merchants, and/or perform other reporting or data modification functions.

The data store 320 may store data that is received and processed by the various modules of the order transaction engine 302. As described above, the data store 320 may store the user accounts 118(1)-118(N). The data store 320 may also store the up-sell configuration files 324 that are received from the merchants. Additionally, the data store 320 may further store data and intermediate products that are generated and/or used by the other modules, such as order information, item suggestions, merchant affiliation data, announcements, messages, and/or the like.

Example Computing Device Modules

Figure 4:
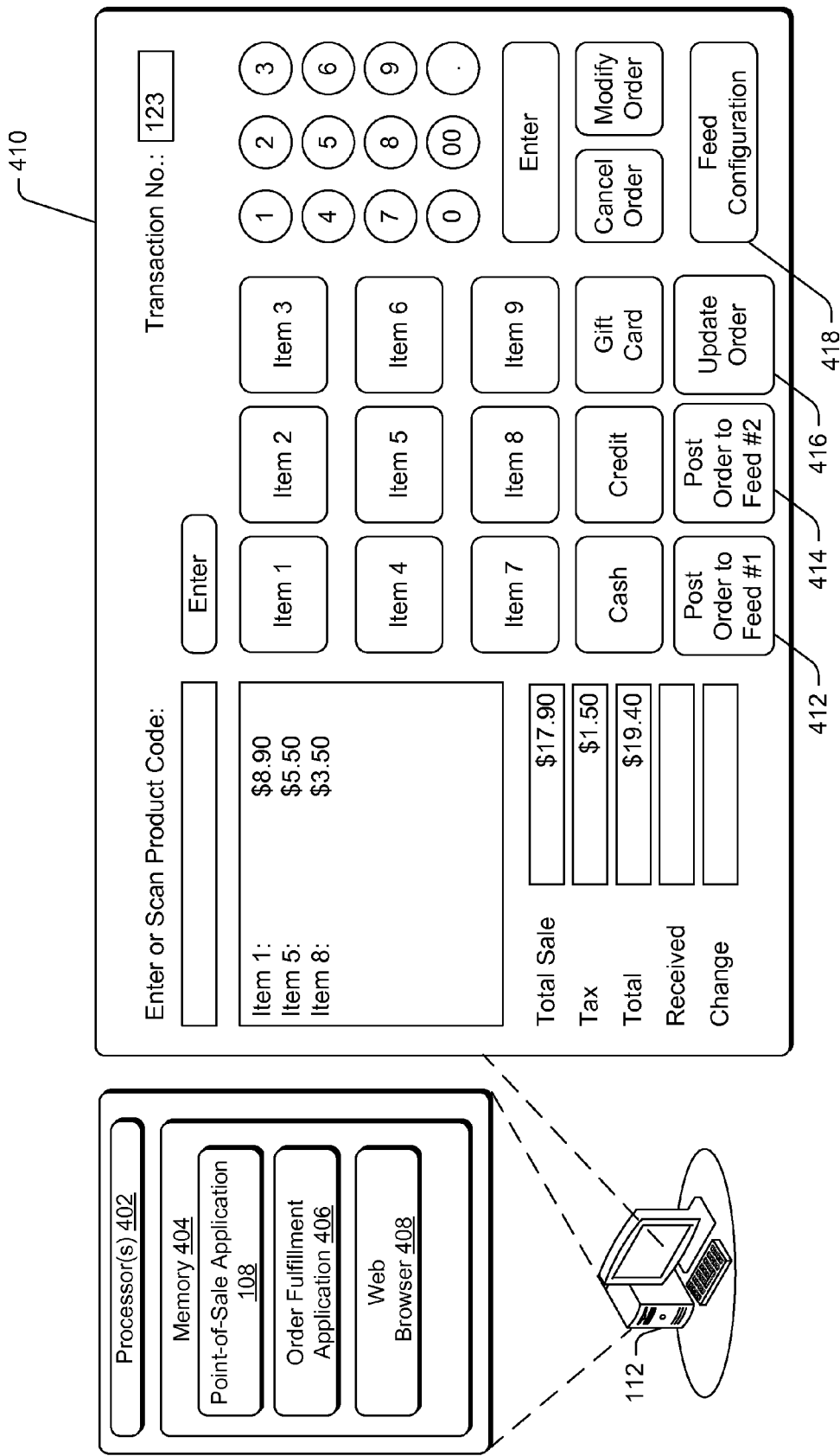
FIG. 4 is a schematic diagram of illustrative components in an example computing device that enables a merchant to communicate with an example order transaction engine regarding purchase transactions.

FIG. 4 is a schematic diagram of illustrative components in an example computing device that enables a merchant to communicate with an example order transaction engine regarding purchase transactions. The example computing device may be the computing device 112 illustrated in FIG. 1.

The computing device 112 may include processor(s) 402 and memory 404. The memory 404 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

The memory 404 may host the point-of-sale application 108, an order fulfillment application 406, and/or a web browser 408. The point-of-sale application 108 may be an electronic cash register application. The merchant 106 may interface with the point-of-sale application 108 via a user interface 410 of the point-of-sale application 108. The user interface 410 may include various operation menu items and keys that enable the merchant 106 to calculate and record sale transactions, receive payments for the sale transactions, and/or generate receipts. In various embodiments, the user interface 410 of the point-of-sale application 108 may also include a post order option 412 that enables the merchant 106 to present an order as a message post on a broadcast feed page, such as the broadcast feed page 122. In some embodiments, when the merchant 106 selects the post order option 412, the point-of-sale application 108 may generate a message post of the order information for an order and upload the message post to the broadcast feed provider 120. In other embodiments, when the merchant 106 selects the post order option 412 for an order, the point-of-sale application 108 may send the order information of the order to the transaction service provider 116 for formulation into a message post. The message post may be posted to the broadcast feed page by the broadcast feed provider 120. In some embodiments, a user interface of the point-of-sale application 108 may include multiple post order options. For example, the user interface 410 may include both the post order option 412 and a post order option 414. In such an example, the post order option 412 may enable the merchant 106 to post an order to a first broadcast feed page. The first broadcast feed page may be a part of a first social network web page or a first blog web page of the merchant 106. Likewise, the post order option 414 may enable the merchant 106 to post the order to a second broadcast feed page. The second broadcast feed page may be a part of a second social network web page or a second blog web page of the merchant 106. In this way, the merchant 106 may have the ability to control the flow of feed information to particular social network web pages and/or specific broadcast feed pages.

The user interface 410 may further include an update post option 416. The update post option 416 may be used by the merchant 106 to change a message post to reflect updates to a corresponding order. The updates to an order may include a cancellation of the order, an addition of one or more other items to the order, a removal of one or more items in the order, changes to taxes and surcharges, an indication that an order has been fulfilled, and/or other messaging. Accordingly, once the merchant 106 has updated an order, the merchant 106 may select the update post option 416 to update the corresponding message post. In turn, the point-of-sale application 108 may directly update a corresponding message post on the broadcast feed page, or interact with the feed update module 310 to update the corresponding message post on the broadcast feed page. In embodiments in which there are multiple post order options, the user interface 410 may include a corresponding number of update post options. Each update order option may be used to update message posts in a corresponding broad feed page.

The user interface 410 may further include a feed configuration option 418. The selection of the feed configuration option 428 may bring up an additional menu that enables the merchant 106 to configure the behaviors of the point-of-sale application 108 with respect to the broadcast feed of orders. In some instances, the point-of-sale application 108 may be configured to automatically publish and/or update a message for each order that is to be paid through the transaction service provider 116. In other instances, the point-of-sale application 108 may be configured to automatically publish and/or update a message post for each order regardless of the payment instrument used. For example, the point-of-sale application 108 may be configured to also post orders that are paid with conventional payment instruments (e.g., cash, credit card, check, etc.). The feed configuration option 418 may also be used to configure whether the point-of-sale application 108 is to independently create and upload message posts to the broadcast feed provider 120, or work cooperatively with the transaction service provider 116 to create and upload message post to the broadcast feed provider 120.

The order fulfillment application 406 may interface with the fulfillment interface module 316 of the order transaction engine 302. The order fulfillment application 406 may display a list of paid orders that are to be fulfilled by the merchant 106. Accordingly, the merchant 106 may fulfill paid orders based on the list of orders. Additionally, the merchant 106 may also use the order fulfillment application 406 to send order fulfillment activity to the fulfillment interface module 316. For example, when an order of cheeseburgers and fries are ready for pick up by a customer, the merchant may use the order fulfillment application 406 to send a corresponding status update to the fulfillment interface module 316. In turn, the fulfillment interface module 316 may command the feed update module 310 to cause the corresponding message post on a broadcast feed page, such as the broadcast feed page 122, to be updated to show that the order is ready.

The web browser 408 may be used to display the broadcast feed pages, such as the broadcast feed page 122. In some instances in which the fulfillment interface module 326 provides a web interface, rather than using the order fulfillment application 406, the merchant 106 may use the web browser 408 to interact directly with the fulfillment interface module 316. In other instances, the merchant 106 may use the web browser 408 to access the broadcast feed page 122 and ascertain the latest status of an order. The broadcast feed page 122 may include an option to filter orders by status indicators. As such, the merchant 106 may configure the broadcast feed page 122 to show orders that are paid, canceled, modified, etc. For example, by filtering for message posts with status indicators of "paid", the merchant 106 may be continually apprised of new order payments, so that the merchant 106 may fulfill these newly paid orders.

Further, in some embodiments, the web browser 408 may also be used by the merchant 106 to update the message posts on the broadcast feed page 122 to indicate changes in the statuses of orders. The updates to an order may include cancellation of the order, addition of one or more other items to the order, removal of one or more items in the order, changes to taxes and surcharges, indicating that an order has been fulfilled, and/or the like. The merchant 106 may also use the web browser 408 to provide announcements and messages.

Figure 5:
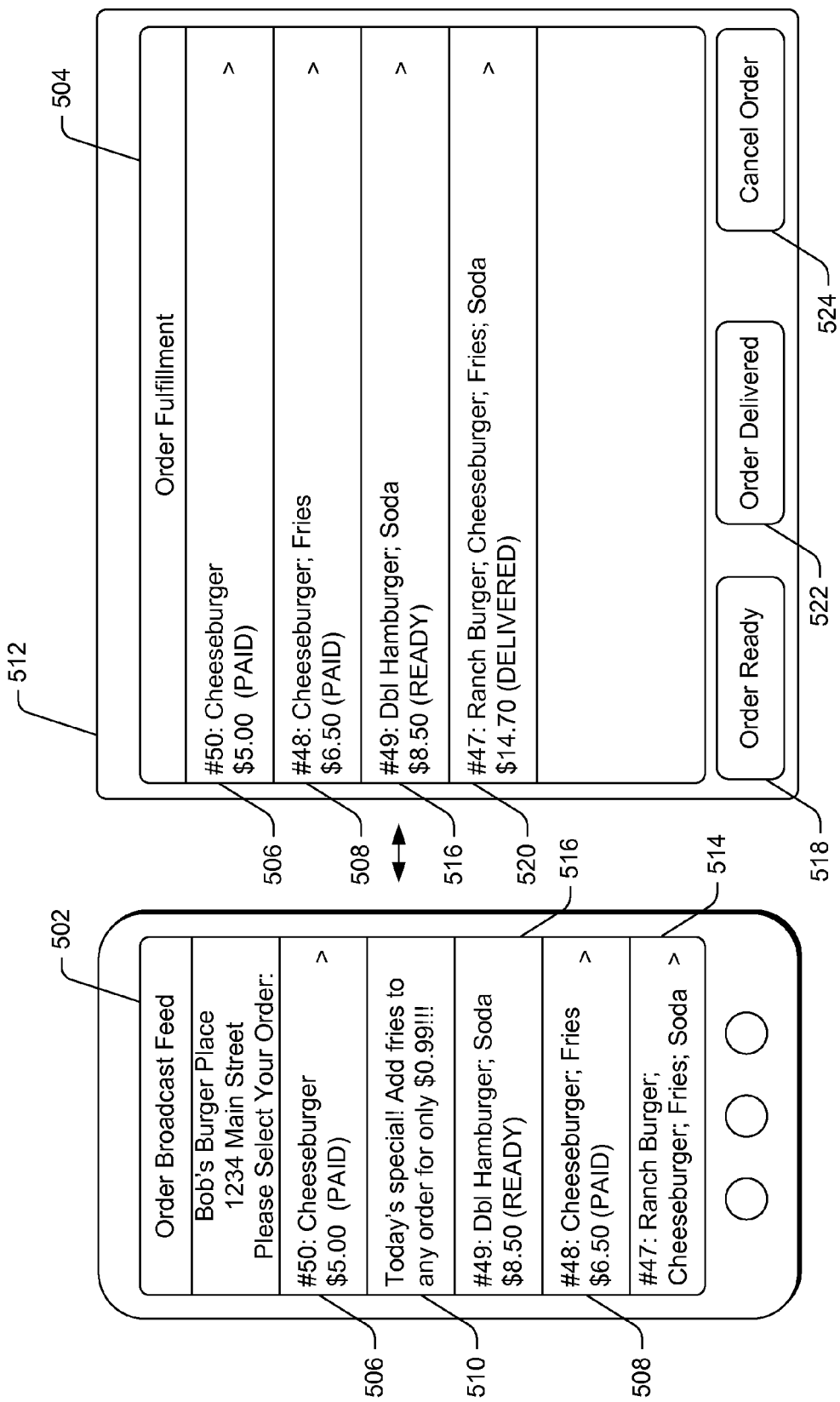
FIG. 5 shows an illustrative broadcast feed of orders that are viewable by customers and an illustrative list of orders that are viewable by a merchant.

FIG. 5 shows an illustrative broadcast feed page 502 of orders that is viewable by customers and an illustrative order fulfillment feed page 504 of orders that are viewable by a merchant. The broadcast feed page 502 may be displayed by a computing device, such as a computing device 102(1). In various embodiments, the broadcast feed page 502 may include message posts that are generated by the broadcast feed module 308 of the order transaction engine 302. The message posts may show details regarding the orders that are placed with a merchant, such as the merchant 106. The details may include status indicators. For example, each of the message posts 506 and 508 may include a paid status indicator. The broadcast feed page 502 may also include a message post 510 of a message that is produced by the suggestion module 314 of the order transaction engine 302.

The order fulfillment feed page 504 of orders may be displayed by the order fulfillment application 406 or the web browser 408 in a user interface screen 512. The order fulfillment feed page 504 may be filtered to exclude message posts of orders that have not been paid for by customers. For example, message posts 510 and 514, which appear on the broadcast feed page 502, may be filtered out from the order fulfillment feed page 504. In various embodiments, the merchant 106 may further update the status indicators of the orders that are shown in the order fulfillment feed page 504. The merchant 106 may update a message post 516 to show that the corresponding order has been fulfilled by selecting the message post 516 and activating the order ready option 518. The update to the message post 516 is then propagated to the broadcast feed page 502 for display on the computing devices, such as the computing devices 102(1)-102(N). The merchant 106 may update a message post 520 to show that the corresponding order has been delivered to a customer by selecting the message post 520 and activating the order delivered option 522. The update to the message post 520 is then propagated to the broadcast feed page 502 for display on the computing devices, such as the computing devices 102(1)-102(N).

Alternatively, the merchant 106 may cancel an order by selecting a message post and activating the cancel order option 524. Accordingly, the cancellation status of the order may be propagated to the broadcast feed page 502. In additional embodiments, the order fulfillment feed page 504 may be the broadcast feed page 122, in which case the broadcast feed page 122 may be configured by the broadcast feed provider 120 to provide filtering options for filtering the order fulfillment feed page 504 according to status indicators.

Further, while the broadcast feed page 502 and the order fulfillment feed page 504 illustrates message posts as being updated in place to show status changes, the status changes may also be implemented as new message posts by the merchant 106, the point-of-sale application 108 and/or feed update module 310. For example, rather than modifying the message post 508 to show a paid status of the order no. 48 after payment is received, the feed update module 310 may in other embodiments cause a new message post that indicates that order no. 48 is paid to be displayed in the broadcast feed page 502 and/or the order fulfillment feed page 504.

Illustrative Operations

FIGS. 6-9 show illustrative processes 600-900 that implement the use of transaction broadcast feeds to facilitate purchase transactions. Each of the processes 600-900 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 600-900 are described with reference to the computing environment 100 of FIG. 1, however other environments may also be used.

Figure 6:
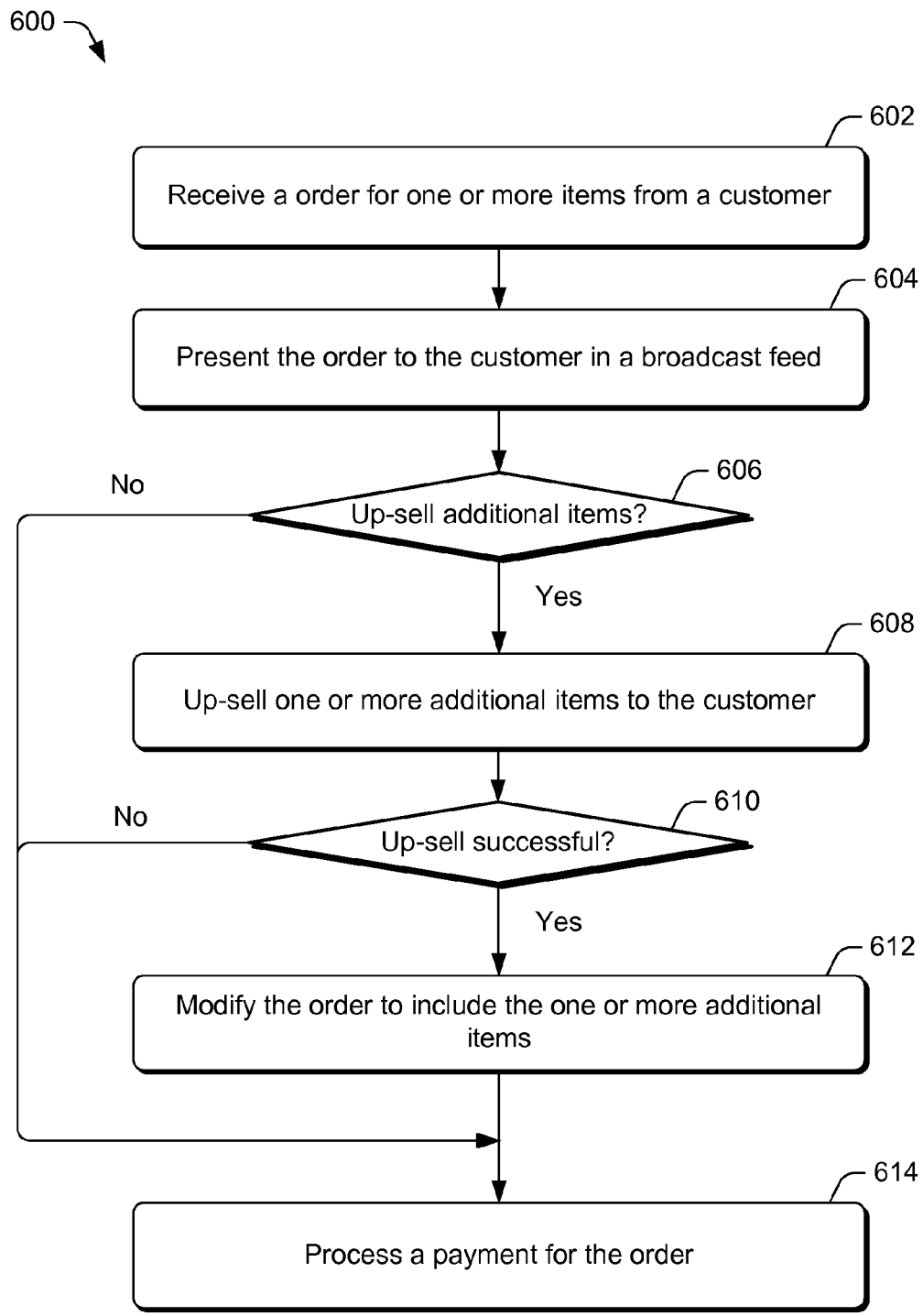
FIG. 6 is a flow diagram of an illustrative process for presenting an order broadcast feed that enables a customer to claim a purchase transaction.

FIG. 6 is a flow diagram of an illustrative process 600 for presenting an order broadcast feed that enables a customer to claim a purchase transaction. At block 602, the merchant 106 may receive an order for one or more items from a customer. In various embodiments, the merchant 106 may enter the order into the point-of-sale application 108. For example, the order may be the order 110(1).

At block 604, the merchant may send the order to the broadcast feed page 122. In some embodiments, the merchant 106 or the point-of-sale application 108 may compose a message post and upload to the message post to the broadcast feed provider 120 for display in the broadcast feed page 122. In other embodiments, the point-of-sale application 108 may pass the order to the transaction service provider 116. At the transaction service provider 116, order information related to the order may be formatted for posting as a message post by the broadcast feed provider 120.

The creation of the message post may include insertion of a link that enables a customer to pay for the order using the transaction service provider 116. The customer may view the broadcast feed page 122 using a web browser on a computing device, such as the computing device 102(1). In some embodiments, the customer may navigate to an online portal that presents the broadcast feed page 122 using a URL that is typed in or obtained via a matrix code inputted via a camera of the computing device. In other embodiments, the customer may navigate to the online portal via an application that is installed on the computing device.

At decision block 606, the merchant (or possibly the transaction service provider 116) may determine whether to up-sell one or more additional items to the customer. The up-sell may occur when the customer claims the order using the link. When the us-sell is initiated by the transaction service provider 116, the transaction service provider 116 may make a determination as to whether to up-sell based on information passed to the transaction service provider 116 in the link, an up-sell configuration file supplied by the merchant 118, and/or an analysis of prior sales data of the merchant 106 by the suggestion module 314 of the order transaction engine 302.

Accordingly, if the merchant 106 or the transaction service provider 116 determines to up-sell one or more additional items to the customer ("yes" at decision block 606), the process 600 may continue to block 608. At block 608, the merchant 106 or the transaction service provider 116 may up-sell the one or more additional items to the customer. The one or more additional items may be items that are offered for sale by the merchant 106 and/or a merchant that is affiliated with the merchant 106.

At decision block 610, the merchant 106 or the transaction service provider 116 may determine whether the up-sell effort was successful. In some embodiments, the customer may accept or decline the one or more additional up-sell items via options that are presented on a payment page. Accordingly, if the up-sell was successful ("yes" at decision block 610), the process 600 may proceed to block 612.

At block 612, the merchant 106 or the transaction service provider 116 may modify the order to include the one or more additional items. The modification may include adjusting a total amount due for the order based on each item that is added to the order. Further, the merchant 106 or the transaction service provider 116 may send information to the broadcast feed provider 120 to update the message post on the broadcast feed page 122 that corresponds to the order. The message post may be updated to reflect the addition of the one or more items. At block 614, the merchant 106 may receive a payment for the order.

However, returning to decision block 606, if the merchant 106 or the transaction service provider 116 determines that no up-sell items is to be presented to the customer ("no" at decision block 606), the process 600 may proceed directly to the block 614. Likewise, returning to decision block 610, if the up-sell was not successful ("no" at decision block 610), the process 600 may also proceed directly to block 614.

Figure 7:
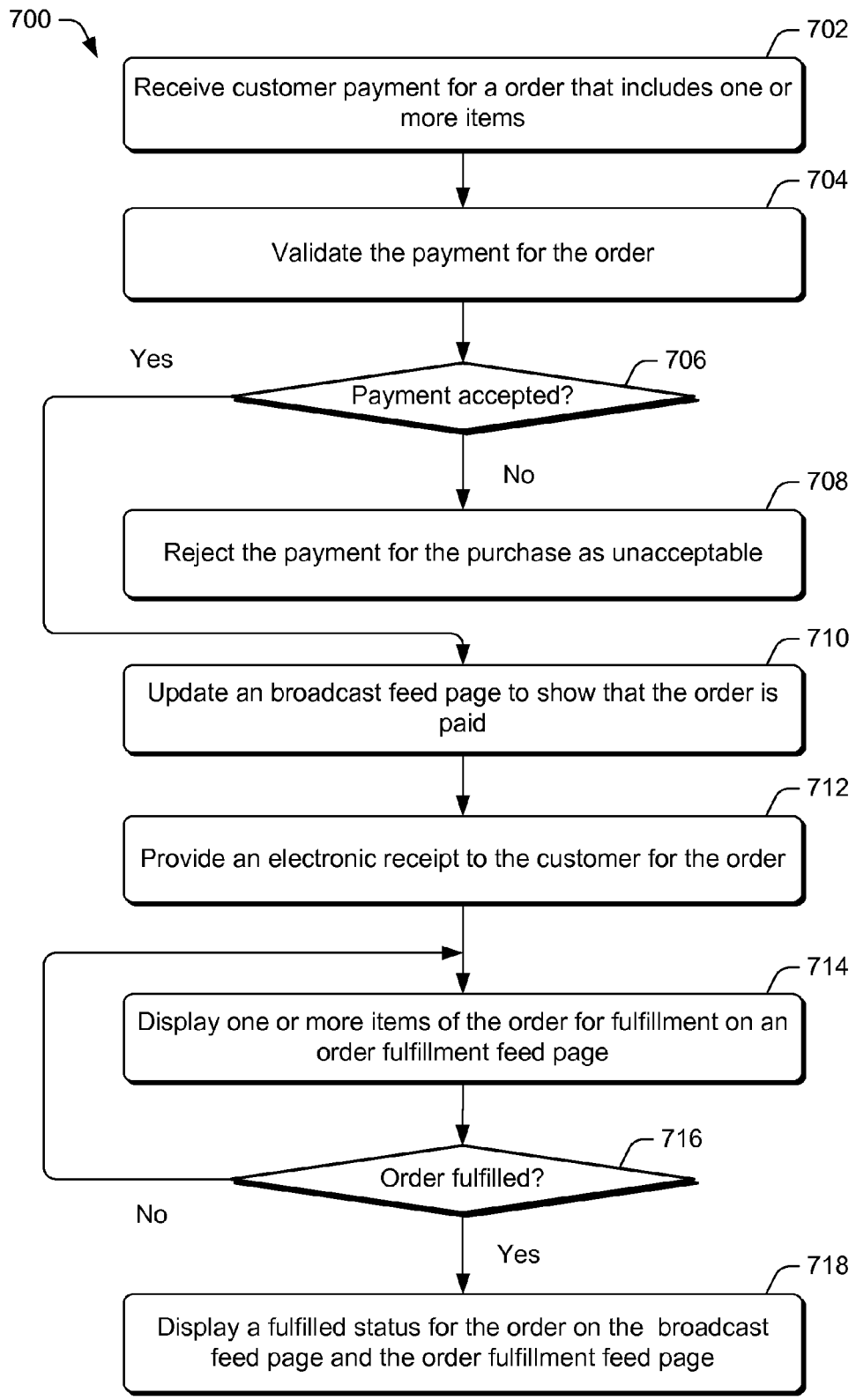
FIG. 7 is a flow diagram of an illustrative process for receiving a payment and fulfilling an order that is presented in a fulfillment broadcast feed.

FIG. 7 is a flow diagram of an illustrative process 700 for receiving a payment and fulfilling an order that is presented in a transaction broadcast feed. At block 702, the transaction service provider 116 may receive a customer payment for an order, such as the order 110(1). The payment may be funded from one or more payment instruments linked to a user account and/or funds stored with the transaction service provider 116 in the user account, such as the user account 118(1).

At block 704, the transaction service provider 116 may validate the payment for the order. The validation may include determining whether the payment is made on a computing device that is within a predetermined distance threshold of the physical location of the merchant 106. Alternatively or concurrently, the validation may include performing a fraud check on the payment to determine whether the payment is potentially fraudulent (e.g., payment funded from a potentially stolen or invalid payment instrument or from a security comprised user account).

Thus, at decision block 706, if the transaction service provider 116 determines that the payment is to be rejected ("no" at decision block 706), the process 700 may proceed to block 708. At block 708, the transaction service provider 116 may reject the payment for the purchase as unacceptable. However, if the transaction service provider 116 determines that the payment is to be accepted ("yes" at decision block 706), the process 700 may proceed to block 710.

At block 710, the transaction service provider 116 may transmit an update to the broadcast feed provider 120 to cause an update of the broadcast feed page 122 to show that the order is paid. In various embodiments, the feed update module 310 may pass the paid status update information to the broadcast feed provider 120 for updating to a corresponding message post on the broadcast feed page 122.

At block 712, the transaction service provider 116 may provide the customer with an electronic receipt for the order. The transaction service provider 116 may further transfer the payment to the merchant 106. In some embodiments, the transaction service provider 116 may withhold a portion of the payment as a service surcharge for performing the payment transaction service.

At block 714, the transaction service provider 116 may transmit a message to cause the order fulfillment application 406 or a web browser 408 to display the paid order in an order fulfillment feed page 504 that is being viewed by the merchant 106. The order fulfillment feed page 504 may present one or more items included in the order so that the merchant 106 may fulfillment these orders. In some instances, rather than monitoring the order fulfillment feed page 504, the merchant 106 may alternatively use the web browser 408 to monitor the broadcast feed page 122 for order payment updates.

Figure 8:
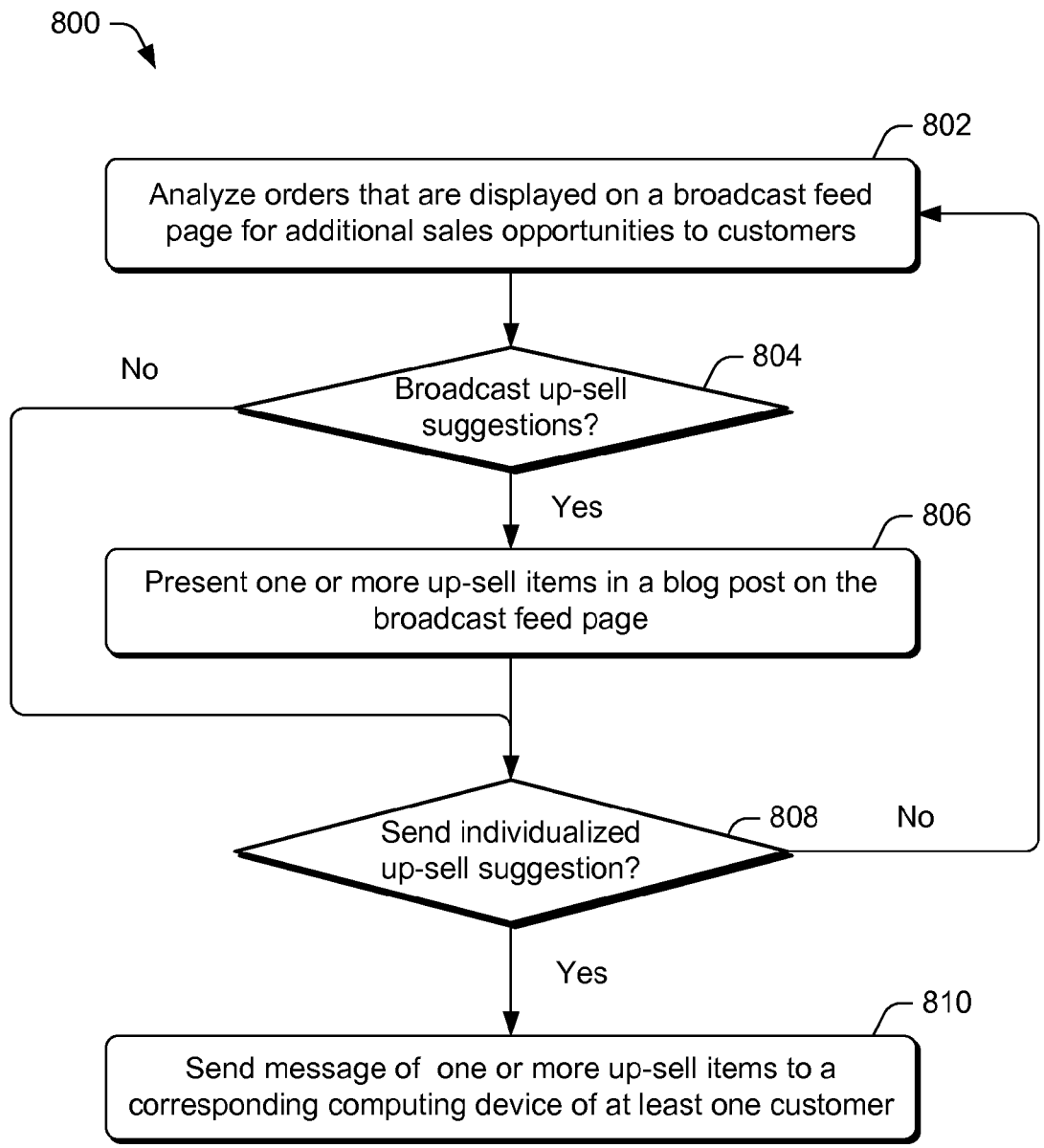
FIG. 8 is a flow diagram of an illustrative process for providing up-sell suggestions to orders that are presented in a transaction broadcast feed.

FIG. 8 is a flow diagram of an illustrative process 800 for providing up-sell suggestions to orders that are presented in a transaction order broadcast feed. At block 802, the transaction service provider 116 may analyze customer orders that are displayed on a broadcast feed page for additional sales opportunities to customers.

In various embodiments, the transaction service provider 116 may use a machine learning algorithm or a classifier algorithm to analyze items in the sales history of the merchant. Based on the analysis, the suggestion module 314 may detect patterns or trends in the items that are being ordered (e.g., best selling items, popular items, unpopular items), and recommend those items or other related items as up-sell items. The items may be being offered for sale for the merchant 106 or a merchant that is affiliated with the merchant 106.

At decision block 804, the transaction service provider 116 may decide whether to broadcast the suggestions of one or more up-sell items in a message post on the broadcast feed page 122. In various embodiments, the suggestion module 314 of the order transaction engine 302 may make this determination based on a configuration setting. Accordingly, if the transaction service provider 116 determines that the one or more up-sell items are to be presented in the broadcast feed page 122 ("yes" at decision block 804), the process 800 may proceed to block 806. At block 806, the transaction service provider 116 may transmit a message to cause the broadcast feed provider 120 to present the one or more up-sell items in a message post on the broadcast feed page 122. Subsequently, the process 800 may proceed to decision block 808. However, if the transaction service provider 116 determines that the one or more up-sell items are not to be presented in the broadcast feed page 122 ("no" at decision block 804), the process 800 may proceed directly to decision block 808.

At decision block 808, the transaction service provider 116 may decide whether to provided individualized suggestions of one or more up-sell items. In various embodiments, the suggestion module 314 of the order transaction engine 302 may make this determination based on a configuration setting. Accordingly, if the transaction service provider 116 determines that one or more up-sell items are to be sent as individualized suggestions ("yes" at decision block 808), the process 800 may proceed to block 810. At block 810, the transaction service provider 116 may present the one or more up-sell items to at least one customer. In some embodiments, the presentation of the one or more up-sell items by the transaction service provider 116 may occur when a customer claims an order listed in the broadcast feed page 122. In other embodiments, the transaction service provider 116 may present the one or more up-sell items to a customer via a text message, an email, a voice mail, and/or other person-specific messages.

However, if the transaction service provider 116 determines that one or more up-sell items are not to be sent as individualized suggestions ("no" at decision block 808), the process 800 may loop back to block 802 so that the transaction service provider 116 may perform additional analysis.

Figure 9:
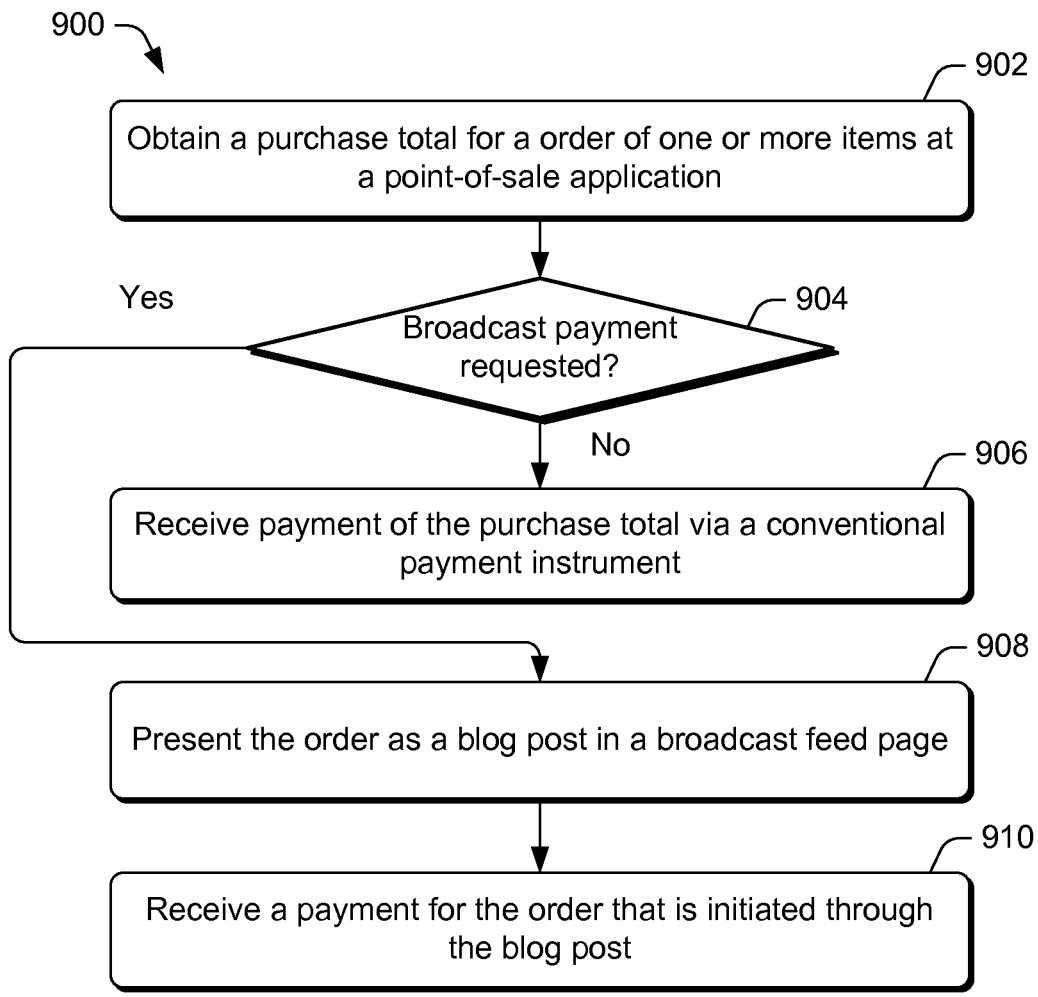
FIG. 9 is a flow diagram of an illustrative process for using a transaction broadcast feed to facilitate a purchase transaction that is initiated at a point-of-sale device.

FIG. 9 is a flow diagram of an illustrative process 900 for using a transaction broadcast feed to facilitate a purchase transaction that is initiated at a point-of-sale device. At block 902, a point-of-sale application 108 may obtain a purchase total for an order of one or more items. The point-of-sale application 108 may be implemented on a cash register at a physical storefront of the merchant 106. The order may involve a customer handing the one or more items to a cashier that is operating the cash register.

At decision block 904, the point-of-sale application 108 may determine whether a broadcast payment is requested. An operator of the point-of-sale application 108 may input that a customer desires to pay for the order via payment message post. The operator may make this input by selecting an option in the user interface 410 of the point-of-sale application 108, such as the post order option 412. Thus, if the point-of-sale application 108 does not receives the request ("no" at decision block 904), the process 900 may continue to block 906. At block 906, the point-of-sale application 108 may receive a payment of the purchase total via a conventional payment instrument. The conventional payment instrument may be cash, credit card, debit card, charge card, gift card, and/or the like.

However, if the point-of-sale application 108 receives the request ("yes" at decision block 904), the process 900 may continue to block 908. At block 908, the point-of-sale application 108 may upload the order information for the order as a message post for posting by the broadcast feed provider 120 on the broadcast feed page 122. Alternatively, the point-of-sale application 108 may pass the order information of the order to the transaction service provider 116. The transaction service provider 116 may format the order information for posting in the broadcast feed page 122 by the broadcast feed provider 120. The order information may be posted as a message post. The message post may include a link that enables a customer to pay for the order via a payment page established by the transaction service provider 116.

At block 910, the merchant 106 may receive a payment for the order that is initiated through the message post. In various embodiments, the merchant 106 may receive the payment from the transaction service provider 116. In some embodiments, the transaction service provider 116 may withhold a portion of the payment as a service surcharge for collecting the payment from the customer and passing the payment to the merchant 106.

In summary, the use of a broadcast feed to disseminate order information to customers may enable a merchant to increase customer exposure to information from the merchant, such as through the merchant's blog or social network portal. Such web visibility may increase the popularity of the merchant, which may in turn lead to increased sales and revenue. Further, the broadcast feed of orders may also serve as a convenient gateway for customers to quickly access their respective online payment services.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method, comprising:
in response to a computing device receiving data for use in navigating to a broadcast feed page of a merchant, causing the broadcast feed page to be presented via a display device associated with the computing device, the broadcast feed page including multiple message posts, individual message posts of the multiple message posts respectively corresponding to individual orders that are placed by customers at a physical retail location of the merchant and that are input into a merchant point of sale device at the physical retail location of the merchant, wherein the individual message posts respectively include individual user-selectable links to respective individual payment interfaces, wherein the individual user-selectable links include embedded order information associated with the individual orders, wherein the individual payment interfaces are configured to provide access to payment information respectively associated with the customers;
receiving, via an input device associated with the computing device, a selection of a user-selectable link that is included in a message post that corresponds to an order that a customer associated with the computing device has placed, the order for one or more items offered for sale by the merchant at the physical retail location of the merchant;
in response to receiving the selection of the user-selectable link, transmitting, by the computing device, to a computing system of a transaction service provider, a request to access a payment interface based at least in part on data associated with the user-selectable link;
presenting, via the display device, a prompt requesting credentials associated with a user account of the customer, the user account being stored by the computing system of the transaction service provider, the credentials being usable to authenticate the customer;
in response to receiving, via the input device, the credentials, and in response to receiving a confirmation from the computing system of the transaction service provider that the customer is authenticated based on the credentials, presenting, via the display device, a payment interface associated with the user-selectable link that provides access to payment information associated with the customer and that enables use of the payment information to implement an electronic payment for the order, the payment interface being populated with the embedded order information included in the user-selectable link;
transmitting, from the computing device, to the computing system of the transaction service provider, metadata that specifies a geographical location of the computing device being used by the customer to view the payment interface;
receiving, from the computing system of the transaction service provider, an indication that an additional item is to be offered for sale by the merchant based on completing a purchase of the one or more items, wherein the indication is provided by the computing system of the transaction service provider based at least in part on an analysis of the one or more items listed in the broadcast feed page against an up-sell configuration file previously provided to the transaction service provider by the merchant, the up-sell configuration file associating the additional item with the one or more items;
presenting, via the display device, the additional item offered for purchase in the payment interface;
receiving, via the input device providing input via the payment interface, a selection indicative of an electronic payment authorization for the order using at least a portion of the payment information associated with the customer, the electronic payment authorization including one of:
a first payment amount based at least in part on a cost for the additional item and a cost for the one or more items based on a determination that the additional item is purchased with the one or more items; or
a second payment amount based at least in part on the cost for the one or more items and not based on the cost for the additional item based on a determination that the additional item is not purchased with the one or more items; and
in response to the computing system of the transaction service provider verifying the electronic payment authorization as a valid payment based on the geographical location of the computing device being within a predetermined distance threshold of the physical retail location of the merchant, presenting, via the display device, a receipt page generated by the computing system of the transaction service provider in response to the electronic payment authorization, the receipt page including order details associated with the order and a selectable feed option that, upon selection, navigates the customer back to the broadcast feed page.

2. The computer implemented method of claim 1, wherein the broadcast feed page is hosted by a blog website or a social network website.

3. A computer implemented method, comprising:
receiving, via a point of sale computing device located at a physical retail location of a merchant, user input to place an order for one or more items offered for sale by the merchant at the physical retail location;
causing, via the point of sale computing device, the order to be transmitted to a computing system of a broadcast feed provider, wherein the broadcast feed provider is configured to present the order as a message post in a social network portal of the merchant or a blog portal of the merchant, the social network portal or the blog portal configured to present one or more other message posts associated with one or more other orders along with the message post that presents the order; and
in response to a selection of an embedded link in the message post that, upon the selection, provides access to payment information associated with a customer that placed the order, receiving, at the point of sale computing device and from a computing system of a transaction service provider, an indication that the customer has authorized for the payment information to be used to implement an electronic payment for the order.

4. The computer implemented method of claim 3, further comprising generating an electronic receipt to be provided to a customer device associated with the customer in response to the receiving the indication that the customer has authorized for the payment information to be used to implement the electronic payment.

5. The computer implemented method of claim 3, further comprising transmitting a message to the computing system of the broadcast feed provider to cause the message post to be updated or to cause a new message post to be created, the updated message post or the new message post indicating that the order is ready for customer pick up or indicating that the order has been or is being delivered to a delivery location associated with the customer.

6. The computer implemented method of claim 3, further comprising transmitting a message to the computing system of the broadcast feed provider to cause a merchant announcement to be posted as entertainment information or marketing information, the merchant announcement to be placed between sequential message posts of the one or more other message posts associated with the one or more other orders presented in the social network portal or the blog portal.

7. The computer implemented method of claim 3, wherein the social network portal or the blog portal is accessible to a customer device associated with the customer via a web browser in response to receiving a uniform resource locator (URL) of the social network portal or the blog portal that is entered into the web browser or in response to a camera associated with the customer device capturing a matrix code provided at the physical retail location.

8. The computer implemented method of claim 3, wherein the social network portal or the blog portal advertises for the merchant.

9. The computer implemented method of claim 3, further comprising causing an indication of a paid status for the order to be presented on a display of the point of sale computing device via a fulfillment feed portal in response to the receiving of the indication that the customer has authorized for the payment information to be used to implement the electronic payment.

10. The computer implemented method of claim 9, wherein the fulfillment feed portal comprises a filtered version of the social network portal or the blog portal that presents information associated with one or more paid orders.

11. The computer implemented method of claim 3, wherein the causing of the order to be transmitted comprises transmitting the order to the computing system of the transaction service provider that subsequently transmits the order to the computing system of the broadcast feed provider.

12. The computer implemented method of claim 3, further comprising transmitting a message to the computing system of the broadcast feed provider to cause a recommendation of an additional item to be presented in the social network portal or the blog portal as an up-sell item that is not initially included in the order.

13. The computer implemented method of claim 12, further comprising causing a fulfillment feed portal presented on a display of the point of sale computing device to be updated so that the fulfillment feed portal includes the additional item in the order.

14. The computer implemented method of claim 12, wherein the recommendation of the additional item is presented based in part on at least one of (i) a designation of the additional item as an associated up-sell item for the one or more items in the order (ii) or an analysis of multiple items purchased together from the merchant.

15. The computer implemented method of claim 12, wherein the additional item is offered for sale by the merchant or another merchant that is affiliated with the merchant.

16. The computer implemented method of claim 3, further comprising verifying the electronic payment as a valid payment in response to ascertaining that the indication that the customer has authorized for the payment information to be used to implement the electronic payment is received from a customer device that is located within a predetermined distance threshold of the physical retail location of the merchant.

17. The computer implemented method of claim 3, further comprising determining that the electronic payment is non-fraudulent prior to updating a status of the order to a paid status.

18. One or more non-transitory computer readable media storing computer-executable instructions that, when executed by one or more processors, configure a point of sale computing device located at a physical retail location of a merchant to:
  in response to receiving, via user input at the point of sale computing device, an order for one or more items offered for sale by the merchant at the physical retail location, cause the order to be transmitted to a computing system of a broadcast feed provider for presenting the order as a message post in a social network portal of the merchant or a blog portal of the merchant, the message post including a link to a payment interface that includes payment information associated with a customer that placed the order and that enables use of the payment information to implement an electronic payment for the order, the social network portal or the blog portal being configured to present one or more other message posts associated with one or more other orders along with the message post that presents the order; and
  in response to a selection of the link in the message post, determine receipt at the point of sale computing device of an indication that the payment information has been authorized to implement the electronic payment for the order.

19. The one or more non-transitory computer readable media of claim 18, wherein the computer-executable instructions further configure the point of sale computing device to determine that the indication that the payment information has been authorized to implement the electronic payment is valid in response to determining that the indication that the payment information has been authorized to implement the electronic payment is received from a computing device that is located within a predetermined distance threshold of the physical retail location of the merchant.

20. The one or more non-transitory computer readable media of claim 18, wherein the computer-executable instructions further configure the point of sale computing device to cause a recommendation to purchase another item to be presented as an additional message post in the social network portal or the blog portal, the recommendation being based at least in part on an analysis of multiple items purchased together from the merchant.

21. A system, comprising:
  one or more processors; and
  memory storing computer-executable instructions that, upon execution by the one or more processors, cause performance of operations comprising:

causing an order of one or more items offered for sale at a physical retail location of a merchant and placed via user input received at a point of sale computing device located at the physical retail location of the merchant to be posted as a message post in a broadcast feed portal, the broadcast feed portal being a social network portal of the merchant or a blog portal of the merchant that is configured to present one or more other message posts associated with one or more other orders along with the message post that presents the order;

in response to a selection of an embedded link in the message post:
  causing presentation of a payment interface that includes payment information associated with a customer that placed the order;
  determining receipt of an indication that authorizes use of the payment information for an electronic payment for the order; and
  providing the electronic payment to the merchant; and
causing the message post to be updated based at least in part on a status of the order.

22. The system of claim 21, the operations further comprising:
presenting the one or more items of the order in an order fulfillment feed portal;
receiving an update indicating that the one or more items in the order are ready for pickup; and
causing at least one of the broadcast feed portal or the order fulfillment feed portal to be updated to show that the order is ready for pickup.

23. The system of claim 21, the operations further comprising causing an additional item to be recommended for purchase based on at least one of a designation of the additional item as an associated up-sell item for the one or more items in the order or an analysis of multiple items purchased together from the merchant.

24. The system of claim 23, the operations further comprising:
causing presentation of a recommendation of the additional item; and
updating a total amount due for the order in response to an indication that the additional item has been ordered.

25. The system of claim 24, the operations further comprising causing the message post to be updated to include the additional item.

26. The one or more non-transitory computer readable media of claim 18, wherein the link to the payment interface includes information that identifies the order from the one or more other orders, the information that identifies the order usable to populate the payment interface with order information.

27. The one or more non-transitory computer readable media of claim 18, wherein the computer-executable instructions further configure the point of sale computing device to transmit a message to the computing system of the broadcast feed provider to cause the message post to be updated or to cause a new message post to be created, the updated message post or the new message post indicating that the order is ready for customer pick up or indicating that the order has been or is being delivered to a delivery location associated with the customer.

28. The system of claim 21, the operations further comprising, prior to providing the electronic payment to the merchant:
receiving metadata from a computing device in response to the computing device being used by the customer to view the payment interface;
obtaining a geographical location of the computing device from the metadata;
determining that the geographical location of the computing device is within a predetermined distance threshold of the physical retail location of the merchant; and
validating the electronic payment based at least in part on determining that the geographical location is within the predetermined distance threshold.

29. The computer implemented method of claim 1, wherein the computing device receiving the data for use in navigating to the broadcast feed page comprises capturing, by a camera associated with the computing device, an image of a matrix code available at the physical retail location, the matrix code encoding a uniform resource locator (URL) of the broadcast feed page, the method further comprising:
transforming, by the computing device, the matrix code into the URL of the broadcast feed page; and
navigating a web browser executing on the computing device to the broadcast feed page based on the URL.

* * * * *